May 5, 1925.

R. A. MOCK 1,537,037

COUPLING ARRANGEMENT FOR PISTON RODS AND CROSSHEADS

Filed Oct. 7, 1922

Inventor
Raymond A. Mock
By Lancaster and Allwine
Attorneys

Patented May 5, 1925.

1,537,037

UNITED STATES PATENT OFFICE.

RAYMOND A. MOCK, OF AMARILLO, TEXAS.

COUPLING ARRANGEMENT FOR PISTON RODS AND CROSSHEADS.

Application filed October 7, 1922. Serial No. 593,025.

*To all whom it may concern:*

Be it known that I, RAYMOND A. MOCK, a citizen of the United States, residing at Amarillo, in the county of Potter and State of Texas, have invented certain new and useful Improvements in a Coupling Arrangement for Piston Rods and Crossheads, of which the following is a specification.

This invention relates to improvements in means for effective connection of piston rods and crossheads.

The primary object of the invention is the provision of a novel coupling arrangement for piston rods and cross heads which will permit of easy assemblage and quick detachment of a piston rod and crosshead.

A further object of this invention is the provision of a relatively simple and compact coupling arrangement which may be used in connection with stationary engines, locomotives, internal combustion engines and like devices, so that piston rods, connecting rods, and other like members may have a secure and quick detachable connection with cross heads or other similar members.

Other objects and advantages of this invention will be apparent during the course of the following detailed description.

In the accompanying drawing, forming a part of this specification, and wherein similar reference characters designate corresponding parts throughout the several views.

Figure 1:
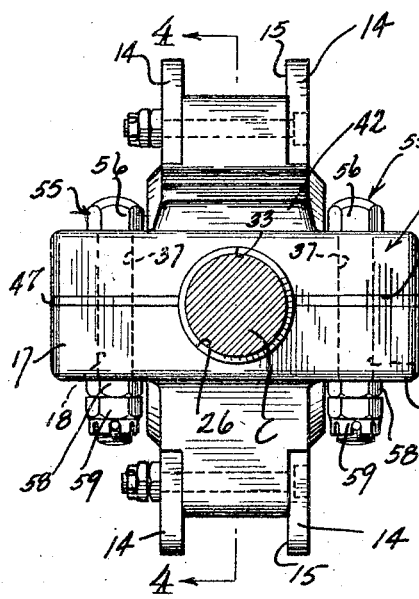
Figure 1 is an end elevation of the novel coupling arrangement.
Figure 2:
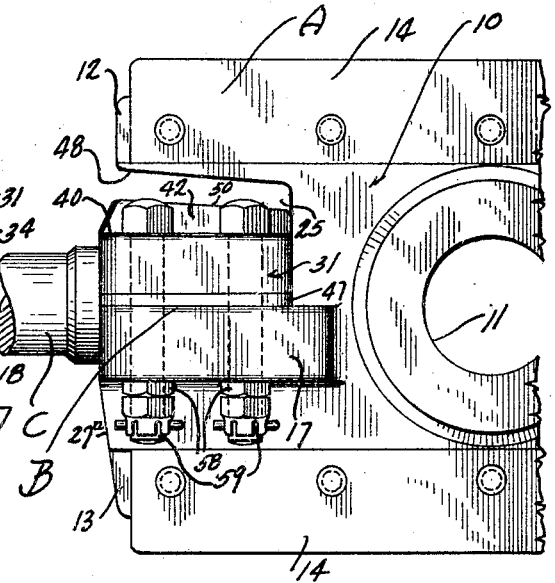
Figure 2 is a side elevation of the novel coupling arrangement, showing the manner in which a piston rod and cross head are effectively connected.
Figure 3:
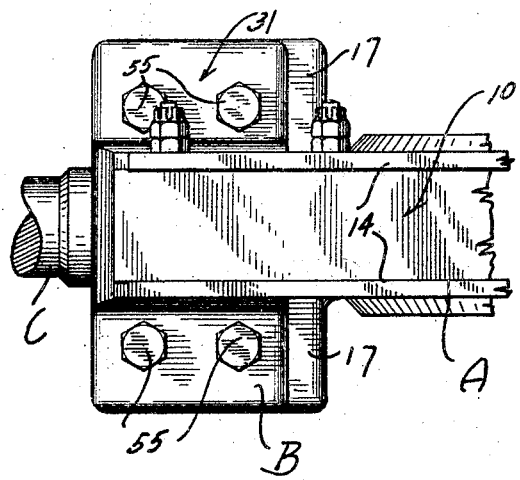
Figure 3 is a fragmentary edge elevation showing certain details of the coupling arrangement.
Figure 4:
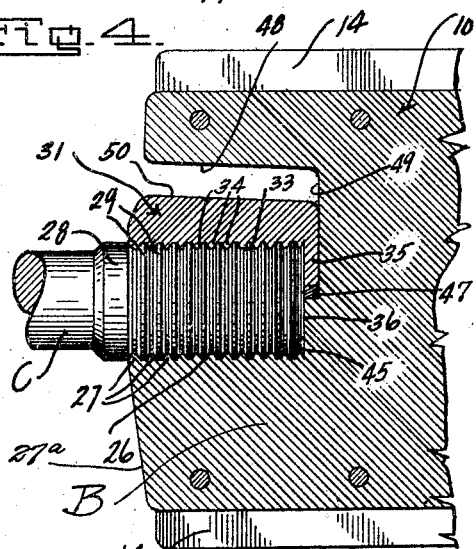
Figure 4 is a fragmentary longitudinal cross sectional view, taken substantially on the line 4—4 of Figure 1.

In the drawing, wherein for the purpose of illustration is shown but the preferred embodiment of this invention, the letter A designates a cross head or like member, having the improved coupling arrangement B associated therewith for the effective coupling of a piston rod, valve rod, or similar member C.

The cross head A preferably includes the main body portion 10 provided intermediate the ends thereof with the usual bearing opening 11 for a connecting rod (not shown). The longitudinal edge portions 12 and 13 of the body 10 may be somewhat reduced for the detachable clamping of the guide plate 14, in order to provide ways 15 at said longitudinal edge portions for the reception of slide bars or projections. Flanges 17 extend outwardly at right angles from both side surfaces of the cross head body portion 10 adjacent one end thereof, and are each provided with a pair of apertures 18 therein. The body portion 10 of the cross head A upwardly of the laterally extending flanges 17 is recessed, as at 25, inwardly from an end thereof, and below the recess 25, and intermediate the flanges 17 is provided with an arcuate pocket 26 which extends longitudinally inwardly from the edge 27$^a$ of the body portion 10. This arcuate pocket 26 is preferably half circled in formation, and is provided with a plurality of uniformly spaced ribs 27, of segmental formation, and substantially V-shaped in cross section.

The end of the piston rod C is of novel formation and may be enlarged as at 28. Inwardly from the end of the piston rod C, the same is provided with a plurality of uniformly spaced circumferential ribs or extensions 29, which may be substantially V-shaped in cross section, and preferably all of the same diameter. This end of the piston rod C is adapted for snug disposition in the pocket 26 of the cross head A, so that substantially one-half thereof extends outwardly of the pocket 26. When in this position, the annular extensions 29 of the piston rod end 28 are cooperatively disposed in the recesses provided in the pocket 26 intermediate the segmental or arcuate extensions 27.

A clamping block 31 is provided, which may be of the same metal or material as the body portion 10 of the cross head A, and which is provided with a pocket 33 extending upwardly from the relatively flat under surface 34 thereof, this pocket 33 being altogether similar to the pocket 26 provided in the cross head body portion 10, and which includes the evenly spaced annular extensions 34 therein, for cooperation with the annular extensions 27 above mentioned. Thus, it can be seen that the pocket 33 in cross section is arcuate. Rearwardly of the pocket 33 a portion 35 extends in such manner as to provide an end for said pocket 33, and which portion 35 is adapted for cooperation with the end surface 36 of the piston rod C, in abutting relation thereagainst when the block 31 is in assembled relation, as will be more fully set forth hereinafter. In transverse dimension, the block 31 is substantially the same dimension as the combined widths of the flanges 17; said block 31 having transverse openings 37 therein, which are adapted for alignment with the opening 18 in the flanges 17, when the block 31 is properly assembled. The upper surface 40 of the clamping block 31 is preferably provided with a reinforcing rib or portion 42, which extends upwardly intermediate the side edges of the block 40 and immediately over the pocket 33, which construction, as can readily be seen, strengthens the block 31.

In the assembly, the piston rod end 28 is disposed in the pocket 26 of the cross head body portion 10 until the rear surface 36 of the piston rod end 28 engages the inside end surface 45 of the pocket 26. In this position, as above mentioned, the ribs 29 or annular extensions are in intermeshing relation with the annular or segmental extensions 27 provided in the pocket 26. A liner 47 may next be placed upon the flanges 17, the same being of proper formation to permit the unobstructed extension of the upper portion of the piston rod end 28 into the recess 25 of the cross head body portion 10. The clamping block 31 is next slipped into the recess 25, and to facilitate such operation, the surface 48 of the body portion 10 which defines that part of the recess 25 opposite the pocket 26, is tapered in converging relation toward the bottom 49 of the recess 25, with respect to the plane in which the flanges 17 lie. Similarly, the top surface 50 of the reinforcing portion 42 is tapered, so that the same lies substantially parallel with the tapered surface 48. In the assembling of the clamping plate 31 in the recess 25, it can readily be understood that the surfaces 48 and 50 in their abutting relation cooperate in the inward and downward sliding of the member 31, so that the end 35 of the clamping member 31 and the pocket 33, slips behind the surface 36 of the piston rod end 28, and in this position the angular or segmental portions 34 provided in the pocket 33 are in intermeshing relation with the circumferential ribs or ridges 29.

When in the position above described, the apertures 37 of the clamping block 21 are in aligning relation with the apertures 18 provided in the flanges 17, and bolts 55 may then be inserted through said aligning apertures, so that the polygonal heads 56 thereof overlie the surface 40 of the clamping block 31 upon each side of the reinforcing projection 42. The screw threaded ends of the bolts 55, which extend through the openings 18 in the flanges 17 are preferably each provided with a plain clamping nut 58, and a castle nut arrangement 59, in order to effectively and securely clamp the member 31 to the body portion 10 of the crosshead A, and to insure against any lateral or longitudinal loose motion at the connection of the piston rod C with the cross head A.

From the foregoing description of this invention, it can be seen that a coupling arrangement for piston rods and cross heads has been provided, which is extremely simple and so compact as to be practical for the easy, safe and quick detachment or attachment of these parts. It should be noted that the cross head A has the body portion 10 thereof of one piece construction, and that the coupling arrangement B is in reality confined to an end of the cross head body portion 10, permitting of the usual or conventional attachment of the connection rod in the bearing opening 11.

Various changes in the shape, size and arrangement of parts may be made to the form of invention herein shown and described, without departing from the sprit of this invention or the scope of the claims.

I claim:

1. In a structure of the character described, a cross head provided with a pocket leading from one end thereof and having a wall provided with a recess extending longitudinally of the pocket, side arms positioned at opposite sides of the body, a clamping block resting upon said side arms and having an intermediate portion positioned in said pocket and provided with a recess cooperating with the recess of the pocket to provide a piston rod receiving socket open at the said end of said cross head, a piston rod having one end fitting within said socket, the walls of the socket and the end portion of the rod fitting within the socket being provided with means interlocking to hold the rod within the socket when said block is secured in place and fastener means for securing said block to the side arms of said cross head.

2. In a structure of the character described, a cross head provided with a pocket leading from one end thereof and having a wall provided with a recess extending longitudinally of the pocket, and terminating in spaced relation to the inner end of the pocket, a clamping block extending transversely through the pocket and having a recess registering with the recess of the pocket to provide a piston rod receiving socket, the clamping block having a web at the inner end of its recess for engaging the inner end of a piston rod fitted within the socket, and fastener means for said clamping block securing the same to the cross head at opposite sides of the socket.

3. As an article of manufacture, a cross head having a body portion thereof provided with a recess extending inwardly from an end thereof, and provided with a pocket communicating with said recess and extending to an end of said body portion inwardly of which said recess is provided, said pocket being arcuate in cross section and having a plurality of segmental extensions therein.

4. In a coupling arrangement of the class described, the combination of a cross head provided with a pocket extending inwardly of an end thereof and having extensions projecting into said pocket, a piston rod having an end thereof provided with extensions adapted for cooperation with the extensions in said pocket, a clamping block provided with a pocket portion therein adapted for cooperation with said rod end upon which the extensions are formed, said block having a portion adapted for engagement with the inner end surface of said piston rod, and clamping means for the securing of said block to said cross head.

5. In a device of the class described, the combination of a cross head including a main body portion provided with a recess extending inwardly from one end thereof and having lateral flanges extending outwardly below said recess, said body portion intermediate said flanges and below said recess having a pocket portion providing a plurality of upwardly extending arcuate ribs therein, a piston rod having an end thereof provided with a plurality of spaced annular ribs adapted for intermeshing relation with the ribs of the pocket in said body portion, said end of the piston rod when located in said pocket having a portion thereof extending into the recess provided inwardly of the body portion, a clamping block having a pocket provided inwardly of the surface thereof and having projections in said pocket adapted for intermeshing relation with the annular ribs of said piston rod, a spacing member adapted for clamping intermediate said block and the flange on said body portion of the cross head, and bolts adapted for the clamping of said block to said flanges.

6. In a device of the class described the combination of a cross head body having a recess inwardly of an end edge thereof, said body also having a pocket facing said recess which also opens at the edge of said body inwardly of which said recess is formed, a piston rod adapted to be inserted into said pocket and to partially project into the recess above said pocket, a clamping block, and means for clamping the block to the body of the cross head for securing the piston rod to the body in the position mentioned.

7. In a device of the class described the combination of a cross head body providing a pocket inwardly from an end edge thereof, means providing slideways along opposite edges of said body and on opposite sides of the pocket, a piston rod adapted to be received within said pocket, and means for clamping the piston rod in the pocket of said body, said means being entirely independent of the means which provides said slideways on said body.

8. In a device of the class described the combination of a cross head body portion providing a pocket therein, a piston rod having an end adapted to interfit in the pocket with a portion thereof projecting from said pocket, a liner, a clamping block having a pocket therein adapted to rest upon said liner with the portion of the piston rod projecting from said first pocket received in the pocket of said block, and bolt means for clamping the block to the body portion of the cross head with the liner between the block and the body portion of the cross head as a means of securing the proper clamping action on the piston rod for obtaining the same to said body of the cross head.

RAYMOND A. MOCK.